US008699701B2

(12) United States Patent
Ghouti et al.

(10) Patent No.: US 8,699,701 B2
(45) Date of Patent: *Apr. 15, 2014

(54) METHOD OF PERFORMING XZ-ELLIPTIC CURVE CRYPTOGRAPHY FOR USE WITH NETWORK SECURITY PROTOCOLS

(75) Inventors: Lahouari Ghouti, Dhahran (SA); Abdulaziz M. Al-Khoraidly, Onaizah (SA); Mohammad K. Ibrahim, Leicester (GB)

(73) Assignee: King Fahd University, Dhahran (SA)

( * ) Notice: Subject to any disclaimer, the term of this patent is extended or adjusted under 35 U.S.C. 154(b) by 644 days.

This patent is subject to a terminal disclaimer.

(21) Appl. No.: 12/958,300

(22) Filed: Dec. 1, 2010

(65) Prior Publication Data

US 2014/0064491 A1    Mar. 6, 2014

(51) Int. Cl.
*G06F 21/00* (2013.01)
(52) U.S. Cl.
USPC ............... 380/30; 380/28; 380/44; 380/259; 380/263; 380/277; 380/278; 380/282; 380/286; 713/176
(58) Field of Classification Search
USPC ......................................................... 380/30
See application file for complete search history.

(56) References Cited

U.S. PATENT DOCUMENTS

| 4,200,770 | A | 4/1980 | Hellman et al. |
| 4,424,414 | A | 1/1984 | Hellman et al. |
| 4,668,103 | A | 5/1987 | Wilson |
| 4,995,082 | A | 2/1991 | Schnorr |
| 5,010,573 | A | 4/1991 | Musyck et al. |
| 5,054,066 | A | 10/1991 | Riek et al. |
| 5,146,500 | A | 9/1992 | Maurer |
| 5,150,411 | A | 9/1992 | Maurer |
| 5,272,755 | A | 12/1993 | Miyaji et al. |
| 6,816,594 | B1 | 11/2004 | Okeya |
| 6,876,745 | B1 | 4/2005 | Kurumatani |
| 7,162,033 | B1 | 1/2007 | Coron |
| 7,308,469 | B2 | 12/2007 | Harley et al. |
| 7,319,751 | B2 | 1/2008 | Kirichenko |
| 7,379,546 | B2 * | 5/2008 | Ibrahim ..................... 380/28 |
| 7,483,533 | B2 | 1/2009 | Ibrahim |
| 7,483,534 | B2 | 1/2009 | Ibrahim |
| 7,639,808 | B2 * | 12/2009 | Izu et al. ................... 380/255 |

(Continued)

FOREIGN PATENT DOCUMENTS

| EP | 0874307 | 10/1998 |
| EP | 0892520 | 1/1999 |
| EP | 1215642 | 6/2002 |
| WO | WO9904332 | 1/1999 |

OTHER PUBLICATIONS

Ansari, Bijan, and M. Anwar Hasan. "High-Performance Architecture of Elliptic Curve Scalar Multiplication." IEEE Transactions on Computers, vol. 57, No. 11, Nov. 2006.*

*Primary Examiner* — Taghi Arani
*Assistant Examiner* — Narciso Victoria
(74) *Attorney, Agent, or Firm* — Richard C. Litman (57) ABSTRACT

The method of performing XZ-elliptic curve cryptography for use with network security protocols provides a computerized method that allows for the encryption of messages through elliptic polynomial cryptography and, particularly, with the embedding of either a symmetric secret key or a public key in the message bit string. The method of performing XZ-elliptic polynomial cryptography is based on the elliptic polynomial discrete logarithm problem. It is well known that an elliptic polynomial discrete logarithm problem is a computationally "difficult" or "hard" problem.

2 Claims, 1 Drawing Sheet

(56) References Cited

U.S. PATENT DOCUMENTS

| | | |
|---|---|---|
| 2003/0072443 A1 | 4/2003 | Harley et al. |
| 2003/0108196 A1 | 6/2003 | Kirichenko |
| 2004/0091105 A1 | 5/2004 | Kim et al. |
| 2004/0114756 A1 | 6/2004 | Moller et al. |
| 2004/0223609 A1 | 11/2004 | Wu |
| 2004/0228478 A1 | 11/2004 | Joye |
| 2004/0247114 A1 | 12/2004 | Joye |
| 2006/0029220 A1 | 2/2006 | Ibrahim |
| 2006/0029221 A1 | 2/2006 | Ibrahim |
| 2008/0080710 A1 | 4/2008 | Harley et al. |
| 2008/0215658 A1 | 9/2008 | Gura et al. |
| 2009/0136022 A1 | 5/2009 | Langendoerfer et al. |

* cited by examiner

METHOD OF PERFORMING XZ-ELLIPTIC CURVE CRYPTOGRAPHY FOR USE WITH NETWORK SECURITY PROTOCOLS

BACKGROUND OF THE INVENTION

1. Field of the Invention

The present invention relates to computerized cryptographic systems and methods for encrypting communications in a computer network or electronic communications system, and particularly to a computerized method of performing XZ-elliptic curve cryptography for use with network security protocols.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible to cryptanalyze. In this regard, the third party could intercept, or otherwise improperly access, a ciphertext message, then substitute a predefined illicit ciphertext block(s), which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain but rather rudimentary form of file protection. Once password protection is circumvented, a third party can access a stored file and then change it, with the owner of the file then being completely oblivious to any such change.

Methods of adapting discrete logarithm based algorithms to the setting of elliptic polynomials are known. However, finding discrete logarithms in this kind of group is particularly difficult. Thus, elliptic polynomial-based crypto algorithms can be implemented using much smaller numbers than in a finite-field setting of comparable cryptographic strength. Therefore, the use of elliptic polynomial cryptography is an improvement over finite-field based public-key cryptography.

In practice, an elliptic curve group over a finite field F is formed by choosing a pair of a and b coefficients, which are elements within F. The group consists of a finite set of points $P(x,y)$ that satisfy the elliptic curve equation:

$$F(x,y) = y^2 - x^3 - ax - b = 0, \quad (1)$$

together with a point at infinity, O. The coordinates of the point, x and y, are elements of F represented in N-bit strings. In the following, a point is either written as a capital letter (e.g., point P) or as a pair in terms of the affine coordinates; i.e. $(x,y)$.

The elliptic curve cryptosystem relies upon the difficulty of the elliptic curve discrete logarithm problem (ECDLP) to provide its effectiveness as a cryptosystem. Using multiplicative notation, the problem can be described as: given points B and Q in the group, find a number k such that $B^k = Q$, where k is the discrete logarithm of Q to the base B. Using additive notation, the problem becomes: given two points B and Q in the group, find a number k such that $kB = Q$.

In an elliptic curve cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

At the heart of elliptic curve geometric arithmetic is scalar multiplication, which computes kB by adding together k copies of the point B. Scalar multiplication is performed through a combination of point-doubling and point-addition operations. The point-addition operations add two distinct points together and the point-doubling operations add two copies of a point together. To compute, for example, $B = (2 \times (2 \times (2B))) + 2B = Q$, it would take three point-doublings and two point-additions.

Addition of two points on an elliptic curve is calculated as follows: when a straight line is drawn through the two points, the straight line intersects the elliptic curve at a third point. The point symmetric to this third intersecting point with respect to the x-axis is defined as a point resulting from the addition. Doubling a point on an elliptic curve is calculated as follows: when a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1,y_1)$ and $(x_2,y_2)$; i.e., $(x_3,y_3) = (x_1,y_1) + (x_2,y_2)$:

TABLE 1

Summary of Addition Rules: $(x_3, y_3) = (x_1, y_1) + (x_2, y_2)$

| | |
|---|---|
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling <br> $(x_3, y_3) = 2(x_1, y_1)$ <br> $(x_2, y_2) = -(x_1, y_1)$ <br> $(x_2, y_2) = O$ <br> $-(x_1, y_1)$ | $m = \dfrac{3x_1^2 - a}{2y_1}$ |

TABLE 1-continued

Summary of Addition Rules: $(x_3, y_3) = (x_1, y_1) + (x_2, y_2)$ $(x_3, y_3) = (x_1, y_1) + (-(x_2, y_2)) = O$
$(x_3, y_3) = (x_1, y_1) + O = (x_1, y_1) = (x_1, -y_1)$ For elliptic curve encryption and decryption, given a message point $(x_m, y_m)$, a base point $(x_B, y_B)$, and a given key, k, the cipher point $(x_C, y_C)$ is obtained using the equation $(x_C, y_C) = (x_m, y_m) + k(x_B, y_B)$.

There are two basics steps in the computation of the above equations. The first step is to find the scalar multiplication of the base point with the key, $k(x_B, y_B)$. The resulting point is then added to the message point, $(x_m, y_m)$ to obtain the cipher point. At the receiver, the message point is recovered from the cipher point, which is usually transmitted, along with the shared key and the base point $(x_m, y_m) = (x_C, y_C) - k(x_B, y_B)$.

As noted above, the x-coordinate, $x_m$, is represented as an N-bit string. However, not all of the N-bits are used to carry information about the data of the secret message. Assuming that the number of bits of the x-coordinate, $x_m$ that do not carry data is L, then the extra bits L are used to ensure that message data, when embedded into the x-coordinate, will lead to an $x_m$ value which satisfies the elliptic curve equation (1). Typically, if the first guess of $x_m$ is not on a curve, then the second or third try will be.

Thus, the number of bits used to carry the bits of the message data is (N−L). If the secret data is a K-bit string, then the number of elliptic curve points needed to encrypt the K-bit data is $$\left(\frac{K}{N-L}\right).$$

It is important to note that the y-coordinate $y_m$ of the message point carries no data bits.

An attack method referred to as power analysis exists in which the secret information is decrypted on the basis of leaked information. An attack method in which change in voltage is measured in cryptographic processing using secret information, such as DES (Data Encryption Standard) or the like, such that the process of the cryptographic processing is obtained and the secret information is inferred on the basis of the obtained process, is known.

As one of the measures against power analysis attack on elliptic curve cryptosystems, a method using randomized projective coordinates is known. This is a measure against an attack method of observing whether a specific value appears or not in scalar multiplication calculations, and inferring a scalar value from the observed result. By multiplication with a random value, the appearance of such a specific value is prevented from being inferred.

In the above-described elliptic curve cryptosystem, attack by power analysis, such as DPA or the like, was not taken into consideration. Therefore, in order to relieve an attack by power analysis, extra calculation has to be carried out using secret information in order to weaken the dependence of the process of the cryptographic processing and the secret information on each other. Thus, time required for the cryptographic processing increases so that cryptographic processing efficiency is lowered.

With the development of information communication networks, cryptographic techniques have been indispensable elements for the concealment or authentication of electronic information. Efficiency in terms of computation time is a necessary consideration, along with the security of the cryptographic techniques. The elliptic curve discrete logarithm problem is so difficult that elliptic curve cryptosystems can make key lengths shorter than that in Rivest-Shamir-Adleman (RSA) cryptosystems, basing their security on the difficulty of factorization into prime factors. Thus, the elliptic curve cryptosystems offer comparatively high-speed cryptographic processing with optimal security. However, the processing speed is not always high enough to satisfy smart cards, for example, which have restricted throughput or servers that have to carry out large volumes of cryptographic processing.

The pair of equations for m in Table 1 are referred to as "slope equations". Computation of a slope equation in finite fields requires one finite field division. Alternatively, the slope computation can be computed using one finite field inversion and one finite field multiplication. Finite field division and finite field inversion are costly in terms of computational time because they require extensive CPU cycles for the manipulation of two elements of a finite field with a large order. Presently, it is commonly accepted that a point-doubling and a point-addition operation each require one inversion, two multiplications, a square, and several additions. At present, there are techniques to compute finite field division and finite field inversion, and techniques to trade time-intensive inversions for multiplications through performance of the operations in projective coordinates.

In cases where field inversions are significantly more time intensive than multiplication, it is efficient to utilize projective coordinates. An elliptic curve projective point (X,Y,Z) in conventional projective (or homogeneous) coordinates satisfies the homogeneous Weierstrass equation:

$$\tilde{F}(X,Y,Z) = Y^2 Z - X^3 - aXZ^2 - bZ^3 = 0, \quad (2)$$

and when $Z \neq 0$, it corresponds to the affine point $$(x, y) = \left(\frac{X}{Z}, \frac{Y}{Z}\right).$$

Other projective representations lead to more efficient implementations of the group operation, such as the Jacobian representations, where the triplets (X,Y,Z) correspond to the affine coordinates $$(x, y) = \left(\frac{X}{Z^2}, \frac{Y}{Z^3}\right)$$

whenever $Z \neq 0$. This is equivalent to using a Jacobian elliptic curve equation that is of the form:

$$\tilde{F}_J(X,Y,Z) = Y^2 - X^3 - aXZ^4 - bZ^6 = 0. \quad (3)$$

Another commonly used projection is the Chudnovsky-Jacobian coordinate projection. In general terms, the relationship between the affine coordinates and the projective coordinates can be written as $$(x, y) = \left(\frac{X}{Z^i}, \frac{Y}{Z^j}\right)$$

where the values of i and j depend on the choice of the projective coordinates. For example, for homogeneous coordinates, i=1 and j=1.

It is important to note that the group addition rules are defined in the affine coordinates and not in any of the projective coordinates; i.e., $$\left(\frac{X_3}{Z_3^i}, \frac{Y_3}{Z_3^j}\right) = \left(\frac{X_1}{Z_1^i}, \frac{Y_1}{Z_1^j}\right) + \left(\frac{X_2}{Z_2^i}, \frac{Y_2}{Z_2^j}\right).$$

In other words, the computation of the coordinate values of $X_3, Y_3$ and $Z_3$ are based on the equations in Table 1, where the value of $Z_3$ is chosen from the denominator of the equations in Table 1 in order to remove the division operations from the calculations of $X_3$ and $Y_3$.

This implies that the points $$\left(\frac{X_1}{Z_1^i}, \frac{Y_1}{Z_1^j}\right), \left(\frac{X_2}{Z_2^i}, \frac{Y_2}{Z_2^j}\right) \text{ and } \left(\frac{X_3}{Z_3^i}, -\frac{Y_3}{Z_3^j}\right)$$

lie on the same straight line, while $(X_1,Y_1,Z_1)$, $(X_2,Y_2,Z_2)$ and $(X_3,-Y_3,Z_3)$ do not lie on the same line. Thus, one cannot write $(X_3,Y_3,Z_3)=(X_1,Y_1,Z_1)+(X_2,Y_2,Z_2)$ when the addition operation is defined over the affine coordinate. It should be noted that defining the elliptic curve points as a group over addition is necessary so that the equation given above can be re-written as $$\left(\frac{X_2}{Z_2^i}, \frac{Y_2}{Z_2^j}\right) = \left(\frac{X_3}{Z_3^i}, \frac{Y_3}{Z_3^j}\right) - \left(\frac{X_1}{Z_1^i}, \frac{Y_1}{Z_1^j}\right).$$

It is this group definition that leads to the fact that decryption, as described above, is, in fact, the reciprocal of encryption. The use of projective coordinates circumvents the need for division in the computation of each point addition and each point doubling during the calculation of scalar multiplication. Thus, integer modular division can be avoided in the calculation of a scalar multiplication, such as $$k\left(\frac{X_B}{Z_B^i}, \frac{Y_B}{Z_B^j}\right),$$

when using projective coordinates.

The last addition for the computation of the cipher point $$\left(\frac{X_C}{Z_C^i}, \frac{Y_C}{Z_C^j}\right)$$

(i.e., the addition of the two points $$\left(\frac{X_m}{Z_m^i}, \frac{Y_m}{Z_m^j}\right)$$

and $$k\left(\frac{X_B}{Z_B^i}, \frac{Y_B}{Z_B^j}\right)$$

can also be carried out in the chosen projection coordinate. In other words, $$\left(\frac{X_C}{Z_C^i}, \frac{Y_C}{Z_C^j}\right) = \left(\frac{X_m}{Z_m^i}, \frac{Y_m}{Z_m^j}\right) + \left(\frac{X_B}{Z_B^i}, \frac{Y_B}{Z_B^j}\right).$$

It should be noted that $Z=1$.

However, in the above, one division (or one inversion and one multiplication) must still be carried out to calculate $$x_C = \frac{X_C}{Z_C^i},$$

since only the affine x-coordinate of the cipher point $x_C$ is sent by the sender.

The use of projective coordinates circumvents the need for division in the computation of each point addition and point doubling during the calculation of scalar multiplication. Thus, finite field division can be avoided in the calculation of a scalar multiplication, such as $$k\left(\frac{X_B}{Z_B^i}, \frac{Y_B}{Z_B^j}\right),$$

when using projective coordinates.

Thus, the encryption of (N−L) bits of the secret message using elliptic curve encryption requires at least one division when using projective coordinates. Similarly, the decryption of a single message encrypted using elliptic curve cryptography also requires at least one division when using projective coordinates.

With regard to secure network protocols, the secure socket layer (SSL) protocol (sometimes referred to as the "transport layer security" (TLS) protocol) is presently the most widely used security protocol on the Internet. The SSL protocol offers encryption, authentication and data integrity over public insecure channels. SSL is designed to be very flexible, as it can accommodate different cryptographic algorithms for key agreement, encryption and hashing. However, the specifications associated with SSL recommend particular combinations, which are generally referred to as "cipher-suits". An example of a cipher-suit is "RSA-RC4-SHA", which indicates that RSA is used for key agreement, RC4 for encryption and SHA for hashing.

The SSL protocol has two main components: the "handshake protocol" and the "record layer protocol". The handshake protocol is used by the client and the server to agree on a common cipher-suit, authenticate each other, and establish a master key using public-key cryptographic algorithms. While authenticating a client in this stage, server authentication is mandatory. Then, the record layer protocol derives shared keys from the master key and performs data encryption and hashing for integrity.

Originally, SSL was defined as using RSA-based public key cryptography for its key exchange and encryption. Later, elliptic curve cryptography (ECC) was included as an option in the set of cipher suits. Since ECC is a public-key system, only the handshake protocol is affected by introducing ECC into SSL. The SSL handshake protocol involves the use of a public-key cryptographic protocol and a digital signature protocol. For ECC-based SSL, elliptic curve Diffie-Hellman (ECDH) and elliptic curve digital signature algorithms (ECDSA) are used as a public key protocol and a digital signature protocol, respectively.

The session begins with a client and the server exchanging random nonces, which are used to prevent replay attacks. Then, a cipher-suit is negotiated with the "ClientHello" and "ServerHello" messages. The server then sends the "ServerCertificate" message, which contains its ECDH public key signed by a certification authority using ECDSA.

After validating the ECDSA signature, the client sends its ECDH key to the server using a "ClientKeyExchange" message. Each entity then uses its private ECDH key along with the other's public key to arrive at a premaster secret. The premaster secret is used, along with the random nonces exchanged earlier, to create a shared key that is used for data transfer. Typically, the data transfer itself still takes place using RC4, which is an RSA-based stream cipher.

IP Security (IPsec) is a protocol that guarantees the data privacy and integrity of IP packets, regardless of the application to which these packets belong. In other words, any application, as long as it uses IP to send data, will benefit from the underlying secure IP network. IPsec has been designed to meet four different goals: privacy, integrity, authentication, and robustness. In addition to data privacy, IPsec allows for dataflow privacy, in which even the identity of the communicating parties cannot be revealed by an attacker. It also contains measures for preventing denial of service (DoS) and replay attacks.

The IPsec framework does not specify encryption algorithms to be used by its implementations. Instead, it provides an empty infrastructure where the desired algorithms may be set. This allows implementations to be modular, customizable for specific problems, and easily upgradeable with new algorithms. A standard set of default algorithms has been specified by the relevant RFCs in order to foster the early adoption of IPsec.

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The main purpose of a VPN is to provide the company with the same capabilities as private leased lines at much lower cost by using the shared public infrastructure. Phone companies have provided private shared resources for voice messages for over a decade. A virtual private network makes it possible to have the same protected sharing of public resources for data.

VPN technologies can be grouped into three major categories: trusted VPN, secure VPN and hybrid VPN. In a secure VPN, all traffic must be encrypted and authenticated. A secure VPN usually takes place on a public network, such as the Internet or the public telephone network. On the other hand, in a trusted VPN, no one other than the trusted VPN provider can affect the creation or modification of a path in the VPN. The entire value of the trusted VPN is that the customer can trust that the provider to provision and control the VPN. Hybrid VPNs use a secure VPN that runs over a trusted VPN. Among others, IPsec is the prevalent tool used to implement secure VPNs. Further, SSL is used, but less commonly so, as it is less flexible than IPsec.

Thus, a method of performing XZ-elliptic curve cryptography for use with network security protocols solving the aforementioned problems is desired.

SUMMARY OF THE INVENTION

The method of performing XZ-elliptic curve cryptography for use with network security protocols provides for improved secure communication over an insecure channel using elliptic curve cryptography. The following method of performing XZ-elliptic cryptography may be used in the SSL protocol, IPsec, VPNs or in any other desired secure network protocol.

A method for performing symmetric key XZ-elliptic curve cryptography includes the following steps: (a) a sending correspondent and a receiving correspondent selecting and agreeing upon an elliptic curve set $EC^3$; and (b) the sending correspondent and the receiving correspondent further agreeing upon a random scalar k, wherein the random scalar k is a shared secret key for communication, and further agreeing upon a base point $(X_B, Y_B, Z_B) \in EC^3$.

The sending correspondent then performs the following steps: (c) embedding a secret message bit string into an elliptic curve message point $(X_m, Y_m, Z_m)$; (d) computing a scalar multiplication between the base point $(X_B, Y_B, Z_B)$ and the random scalar k as $(X_{Bk}, Y_{Bk}, Z_{Bk}) = k(X_B, Y_B, Z_B)$; (e) computing a cipher point $(X_c, Y_c, Z_c)$ as $(X_c, Y_c, Z_c) = (X_m, Y_m, Z_m) + k(X_B, Y_B, Z_B)$; and (f) sending a set of appropriate bits of $X_c$ and $Z_c$ to the receiving correspondent.

The receiving correspondent then performs the following steps: (g) computing a scalar multiplication between the base point $(X_B, Y_B, Z_B)$ and the random scalar k as $(X_{Bk}, Y_{Bk}, Z_{Bk}) = k(X_B, Y_B, Z_B)$; (h) computing the elliptic curve message point $(X_m, Y_m, Z_m)$ as $(X_m, Y_m, Z_m) = (X_c, Y_c, Z_c) - k(X_B, Y_B, Z_B)$; and (i) retrieving the secret message bit string from $X_m$ and $Z_m$.

Alternatively, the method of performing XZ-elliptic curve cryptography may also be implemented in a public key cryptosystem, using the following steps: (a) a sending correspondent and a receiving correspondent selecting and agreeing upon an elliptic curve set $EC^3$, the sending correspondent establishing a sending private key $k_{SPr}$ and the receiving correspondent establishing a receiving private key $k_{RPr}$; and (b) the sending correspondent and the receiving correspondent further agreeing upon a base point $(X_B, Y_B, Z_B) \in EC^3$, the receiving correspondent establishing a receiving public key $k_{RPr}(X_B, Y_B, Z_B)$ and the sending correspondent establishing a sending public key $k_{SPr}(X_B, Y_B, Z_B)$.

The sending correspondent then performs the following steps: (c) calculating a shared key as $k_{SPr}(k_{RPr}(X_B, Y_B, Z_B))$; (d) embedding a secret message bit string into an elliptic curve message point $(X_m, Y_m, Z_m)$; (e) computing a cipher point $(X_c, Y_c, Z_c)$ as $(X_c, Y_c, Z_c) = (X_m, Y_m, Z_m) + k_{SPr}(k_{RPr}(X_B, Y_B, Z_B))$; and (f) sending a set of appropriate bits of $X_m$ and $Z_m$ to the receiving correspondent.

The receiving correspondent then performs the following steps: (g) calculating the shared key as $k_{RPr}(k_{SPr}(X_B, Y_B, Z_B))$; (h) computing the elliptic curve message point $(X_m, Y_m, Z_m)$ as $(X_m, Y_m, Z_m) = (X_c, Y_c, Z_c) - k_{RPr}(k_{SPr}(X_B, Y_B, Z_B))$; and (i) retrieving the first secret message bit string from $X_m$ and $Z_m$.

These and other features of the present invention will become readily apparent upon further review of the following specification and drawings.

BRIEF DESCRIPTION OF THE DRAWINGS

The sole drawing Figure is a block diagram illustrating system components for a method of performing XZ-elliptic curve cryptography for use with network security protocols according to the present invention.

DETAILED DESCRIPTION OF THE PREFERRED EMBODIMENTS

The method of performing XZ-elliptic curve cryptography with network security protocols provides for improved secure communication over an insecure channel using elliptic curve cryptography. The method utilizes two stages of coordinate projections. In the first of the three stages, a projective coordinate is used to embed extra message data bits in the Z-coordinate, as well as in the X-coordinate. In the second stage, a projective coordinate is used to remove a division operation at each iteration (and also for randomizing the computation) in order to provide a countermeasure against differential power analysis.

The method begins by defining a set of elliptic curve points represented in projective coordinates as a group over addition. Given a field $F(p)$, and defining a & $b \epsilon F(p)$, where the symbol $\epsilon$ denotes set membership, $EC^2$ is defined as the set of points (x,y) that satisfy the elliptic curve equation in affine coordinates (i.e., $F(x,y)=y^2-x^3-ax-b=0$), where x & $y \epsilon F(p)$, together with a point at infinity.

It is known that using the addition rules defined above for the set of points $EC^2$, the set $EC^2$ forms an abelian group over addition, denoted as $(EC^2, +)$. The present method utilizes a projection (X,Y,Z), which is related to the affine coordinates as:

$$y = \frac{Y}{Z^{\frac{3}{2}}} \quad (4)$$

$$x = \frac{X}{Z}. \quad (5)$$

Substitution of equations (5) and (6) into the elliptic curve equation yields:

$$\tilde{F}(X, Y, Z) = Z^3 F\left(\frac{X}{Z}, \frac{Y}{Z^{\frac{3}{2}}}\right) = Y^2 - X^3 - aXZ^2 - bZ^3 = 0. \quad (6)$$

It should be noted that if $F(x,y)$ is non-singular (i.e., $4a^2+27b^3 \neq 0$), then $\tilde{F}(X,Y,Z)$ is also non-singular. In the following, it is assumed that the elliptic curve equations are non-singular.

The set of points $EC^3$ is defined as the triplets (X,Y,Z), where X,Y & $Z \epsilon F(p)$, that satisfy equation (6), along with a point at infinity $(X_I, Y_I, Z_I)$, and excluding the point at the origin (0,0,0). It should be noted that $EC^3$ is in projective coordinates, while $EC^2$ is in affine coordinates. The addition rules for the group $(EC^2, +)$ can be adopted to define an additive binary operation, denoted as "+", over $EC^3$. For all $(X_1,Y_1,Z_1) EC^3$ and $(X_2,Y_2,Z_2) \epsilon EC^3$, the sum $(X_3,Y_3,Z_3)=(X_1,Y_1,Z_1)+(X_2,Y_2,Z_2)$ is also $(X_3,Y_3,Z_3) EC^3$.

It can be seen that $(EC^3, +)$ also forms a group over addition that satisfies the following axioms:
 (i) There exists $(X_I,Y_I,Z_I) \epsilon EC^3$ such that $(X,Y,Z)+(X_I,Y_I,Z_I)=(X,Y,Z)$ for all $(X,Y,Z) \epsilon EC(K^3)$;
 (ii) for every $(X,Y,Z) \epsilon EC^3$, there exists $-(X,Y,Z) \epsilon EC^3$ such that $(X,Y,Z)-(X,Y,Z)=(X_I,Y_I,Z_I)$;
 (iii) the additive binary operation is commutative; and
 (iv) the additive binary operation is associative.

With regard to the addition rules for the group $(EC^3, +)$, the addition of two points on an elliptic curve in projective coordinate $EC^3$ is calculated as follows. When a straight line is drawn through two points of $EC^3$, the straight line intersects the elliptic curve in projective coordinates at a third point. The point symmetric to this third intersecting point with respect to the X-axis is defined as a point resulting from the addition.

A straight-line equation in projective coordinates is given by:

$$\frac{X-X_1}{X_2-X_1} = \frac{Y-Y_1}{Y_2-Y_1} = \frac{Z-Z_1}{Z_2-Z_1}. \quad (7)$$

The basic addition rule can be formulated as follows. Draw the line that joins the two points to be added in the set $EC^3$. Denoting the third point of intersection as $(X'_3,Y'_3,Z'_3)$, the sum point is defined as $(X_3,Y_3,Z_3)=(X'_3,Y'_3,Z'_3)$. It follows from the above definition that the addition over $EC^3$ is commutative, that is:

$$(X_1,Y_1,Z_1)+(X_2,Y_2,Z_2)=(X_2,Y_2,Z_2)+(X_1,Y_1,Z_1)$$

for all $(X_1,Y_1,Z_1) \epsilon E(K^3)$ and $(X_2,Y_2,Z_2) \epsilon E(K^3)$. This satisfies axiom (iii) above.

There are four main cases that need to be considered for the computation of addition for $(EC^3, +)$:

$$X_1 \neq X_2; \quad (A)$$

$$X_1 = X_2 \text{ and } Z_1 \neq Z_2; \quad (B)$$

$$(X_1,Y_1,Z_1)=(X_2,Y_2,Z_2) \text{ (i.e., point doubling); and} \quad (C)$$

$$X_1 = X_2 \text{ and } Z_1 = Z_2. \quad (D)$$

For case (A), where $X_1 \neq X_2$, we have:

$$Y'_3 = Y_1 + m_y(X'_3 - X_1) \quad (8)$$

and $$Z'_3 = Z_1 + m_z(X'_3 - X_1), \quad (9)$$

where:

$$m_y = \frac{Y_2 - Y_1}{X_2 - X_1} \quad (10)$$

and $$m_z = \frac{Z_2 - Z_1}{X_2 - X_1}. \quad (11)$$

Substituting equation (8) for $Y'_3$ and equation (9) for $Z'_3$ into equation (6) yields:

$$(Y_1+m_y(X-X_1))^2 - X^3 - aX(Z_1+m_z(X-X_1))^2 - b(Z_1+m_z(X-X_1))^3 = 0 \quad (12)$$

Expanding the terms between parentheses and grouping the terms with the same powers of X gives:

$$X^3 + am_z^2 X^3 + bm_z^3 = X^3 - m_y^2 X^2 + 2am_z Z_1 X^2 - 2am_z^2 X^2 X_1 + bm_z^2 Z_1 X^2 + 2bm_z^2 Z_1 X^2 - 2bm_z^3 X_1^2 - bm_z^3 X^2 X_1 - 2m_y Y_1 X + 2m_y^2 XX_1 + aXZ_1^2 - 2am_z Z_1 XX_1 + am_z^2 XX_1^2 + 2bm_z Z_1^2 X - 2XX_1 bm_z^2 = Z_1 + bm_z XZ_1^2 - 4bm_z^2 Z_1 XX_1 + bm_z^3 XX_1^2 + 2bm_z^3 XX_1^2 - Y_1^2 + 2m_y Y_1 X_1 - m_y^2 X_1^2 + bZ_1^3 - 2bm_z Z_1^2 X_1 + bX_1^2 m_z^2 Z_1 - bm_z X_1 Z_1 + 2bm_z^2 Z_1 X_1^2 - bm_z^3 X_1^3 = 0. \quad (13)$$

In order to solve the above, it is recognized that any cubic equation has three roots, such that:

$$(X-X_1)(X-X_2)(X-X'_3)=0, \quad (14)$$

and scaling the coefficient of the term $X^3$ to 1 in equation (13), and equating the coefficient of the term $X^2$ in equations (13) and (14), yields:

$$X'_3 = \frac{1}{c}(m_y^2 - 2am_z Z_1 + 2am_z^2 X_1 - 3bm_z^2 Z_1 + 3bm_z^3 X_1) - X_1 - X_2 \quad (15)$$

or $$X'_3 = \frac{1}{c}(m_y^2 - (2a + 3bm_z)m_z Z_1 + (2a + 3bm_z)m_z^2 X_1) - X_1 - X_2. \quad (16)$$

After grouping terms to reduce the number of computations, one obtains $$X'_3 = \frac{1}{c}(m_y^2 - m_z(2a + 3bm_z)(Z_1 - m_z X_1)) - X_1 - X_2, \quad (17)$$

where $$c = 1 + am_z^2 + bm_z^3. \quad (18)$$

Substituting the solution of $X'_3$, which is given in equation (17), into equation (8) yields the solution for $Y'_3$. Similarly, substituting the solution of $X'_3$, which is given in equation (17), into equation (9) produces the solution for $Z'_3$.

For case (B), where $X_1 = X_2$ and $Z_1 \neq Z_2$, we let $X_o = X_1 = X_2$. In this case, $X_3 = X_1 = X_2 = X_o$, since the straight line is in the YZ-plane $X_o$. Thus, one can write:

$$Y'_3 = Y_1 + n_y(Z'_3 - Z_1), \quad (19)$$

where $$n_y = \frac{Y_2 - Y_1}{Z_2 - Z_1}.$$

Substituting equation (19) into equation (6) (and noting that $X = X_0$) yields:

$$(Y_1 + n_y(Z - Z_1))^2 - X_o^3 - aX_o Z^2 - bZ^3 = 0. \quad (20)$$

Expanding the terms between parentheses and grouping the terms with the same powers of Z, one obtains:

$$Z^3 - \frac{1}{b}(n_y^2 Z^2 - aX_o Z^2) + \quad (21)$$
$$\frac{1}{b}(2n_y Y_1 Z - 2n_y^2 ZZ_1 + Y_1^2 - 2n_y Y_1 Z_1 + n_y^2 Z_1^2 - X_o^3) = 0.$$

In order to solve the above, it is recognized that any cubic equation has three roots, such that:

$$(Z-Z_1)(Z-Z_2)(Z-Z'_3)=0. \quad (22)$$

Equating the coefficient of the term $Z^2$ in equations (21) and (22), one obtains:

$$Z'_3 = \frac{1}{b}(n_y^2 - aX_o) - Z_1 - Z_2, \quad (23)$$

and substituting the solution of $Z'_3$ into equation (19) produces the solution for $Y_3$.

For case (C), which involves point doubling, $(X_1, Y_1, Z_1) = (X_2, Y_2, Z_2)$. Letting $(X_o, Y_o, Z_o) = (X_1, Y_1, Z_1) = (X_2, Y_2, Z_2)$, then $(X_3, Y_3, Z_3) = 2(X_o, Y_o, Z_o)$. Doubling a point on an elliptic curve in projective coordinates can be defined in several ways. In the first case (C.1), when a tangent line in an XY-plane is drawn at a point on an elliptic curve, the tangent line intersects the elliptic curve in the projective coordinates $EC^3$ at another point. The point symmetric to this intersecting point with respect to the X-axis is defined as a point resulting from the doubling. It should be noted that in this case, $Z'_3 = Z_o$.

In the second case (C.2), when a tangent line in a Z-plane is drawn at a point on an elliptic curve, the tangent line intersects the elliptic curve in the projective coordinates $EC^3$ at another point. The point symmetric to this intersecting point with respect to the X-axis is defined as a point resulting from the doubling. It should be noted that, in this case, $X'_3 = X_o$.

In a third case (C.3), some form of a combination of rules (C.1) and (C.2) may be used. The simplest combination is to perform doubling using rule (C.1) followed by another doubling using rule (C.2). Another combination involves using the gradients in (C.1) and (C.2) simultaneously. In the following, cases (C.1) and (C.2) are considered.

For case (C.1), $Z_3 = Z_1 = Z_2 = Z_o$. The gradient of the tangent of the point $(X_o, Y_o, Z_o)$ of the elliptic curve in projective coordinates in an XY-plane is given by:

$$\frac{dY}{dX} = \frac{3X_o^2 + aZ_o^2}{2Y_o} = m_y. \quad (24)$$

Substituting equation (24) for $m_y$ in the equation for $X'_3$, and noting that $m_z = 0$ in this case, one obtains the solution for $X'_3$:

$$X'_3 = m_y^2 - X_1 - X_2. \quad (25)$$

One may similarly obtain the solution for $Y'_3$ from case (A) above.

For case (C.2), $X_3 = X_1 = X_2 = X_o$. The gradient of the tangent of the point $(X_o, Y_o, Z_o)$ of the elliptic curve in projective coordinates in a YZ-plane is given by:

$$\frac{dY}{dZ} = \frac{2aX_o Z_o + 3bZ_o^2}{2Y_o} = n_y. \quad (26)$$

Substituting equation (26) for n, in equation (23), one obtains a solution for $Z_3$:

$$Z'_3 = \frac{1}{b}(n_y^2 - aX_o) - Z_1 - Z_2. \quad (27)$$

Similarly, substituting the solution of $Z_3$ into equation (19), one obtains the solution for $Y'_3$.

For case (D), $X_1 = X_2$ and $Z_1 = Z_2$. Letting $X_o = X_1 = X_2$ and $Z_o = Z_1 = Z_2$ allows for substitution of these values directly into equation (6), thus producing a quadratic equation for the Y-coordinate:

$$Y^2 = X_o^3 + aX_o Z_o^2 + bZ_o^3, \quad (28)$$

where $Y_o$ represents one of the solutions. The other solution must be $-Y_o$.

Therefore, a line perpendicular to the XZ-plane intersects $EC^3$ at only two points: $(X,Y,Z)$ and $(X,-Y,Z) \in EC^3$. This clearly shows the symmetry of $EC^3$ about the X-axis and the Z-axis. Furthermore, every $(X,Y,Z) \in EC^3$ has a unique mirror image point $(X,-Y,Z) \in EC^3$. Thus, since a line joining such pairs $(X,Y,Z)$ and $(X,-Y,Z) \in EC^3$ does not intersect with $EC^3$ at a third finite point, such lines are assumed to intersect with $EC^3$ at the point of infinity $(X_1,Y_1,Z_1)$. This point at infinity is used to define both the inverse of a point in $EC^3$ and the identity point. According to the addition rule defined above, one can write:

$$(X,Y,Z)+(X,-Y,Z)=(X_1,Y_1,Z_1), \quad (29)$$

since the third point of intersection of such lines is the point at infinity. This equation therefore defines a unique inverse for any point $(X,Y,Z) \in EC^3$, $$-(X,Y,Z)=(X,-Y,Z). \quad (30)$$

Thus, equation (29) can be written as:

$$(X,Y,Z)-(X,Y,Z)=(X_1,Y_1,Z_1). \quad (31)$$

Additionally, a line joining the point at infinity and any point $(X,Y,Z) \in EC^3$ will intersect with $EC^3$ at $(X,-Y,Z)$. Therefore, from the addition rule defined above, one may also write:

$$(X,Y,Z)+(X_1,Y_1,Z_1)=(X,Y,Z). \quad (32)$$

Equation (31) satisfies axiom (ii) while equation (32) satisfies axiom (i) of the group $(EC^3,+)$.

One way of proving associativity of $(EC^3, +)$ is as follows. Given particular elliptic curves (i.e., for particular coefficient's a and b and a finite field $F(p)$, if it can be shown by computation that any point $Q \in EC^3$ can be uniquely written as $k_Q P$, where P is the generator point of the group $(EC^3, +)$, then $EC^3$ groups based on such curves are associative.

The reason for the above is that any three points Q, R, S $\in EC^3$ can be written as $k_Q P, k_R P, k_S P \in EC^3$, respectively. Thus their sum:

$$(Q+R+S)=(k_Q P+k_R P+k_S P)=(k_Q+k_R+k_S)P$$

can be carried out in any order.

With regard to the second projective coordinate, each of the equations for point addition and point doubling derived for the cases (A), (B) and (C) above require one modular inversion or division. In cases where field inversions or divisions are significantly more expensive than multiplication (in terms of time and computational power), a second projective coordinate is used to remove the requirement for field inversion or division from these equations. As shown below, the number of operations needed for $EC^3$ point doubling and point addition when performed in the second projective coordinate are comparable to those needed in $EC^2$. It should be noted that several projective coordinates can be used. In the present method, the homogenous projection is used as an example:

$$X = \frac{X}{V} \quad (33)$$

$$Y = \frac{Y}{V} \quad (34)$$

$$Z = \frac{Z}{V}. \quad (35)$$

Using this projection in the elliptic curve equation given by equation (6), one obtains a homogeneous elliptic curve equation:

$$\tilde{F}(X,Y,Z,V) = V \tilde{F}\left(\frac{X}{V}, \frac{Y}{V}, \frac{Z}{V}\right) = Y^2 V - X^3 - aXZ^2 - bZ^3 = 0, \quad (36)$$

where an elliptic curve projective point $(X,Y,Z,V)$ using homogenous projective coordinates satisfies the homogenous elliptic curve equation (36).

When $V \neq 0$, the homogenous projected point $(X,Y,Z,V)$ corresponds to the projected point $$(X, Y, Z) = \left(\frac{X}{V}, \frac{Y}{V}, \frac{Z}{V}\right).$$

Using homogenous projective coordinates, the equation for point addition can be written as:

$$\left(\frac{X_3}{V_3}, \frac{Y_3}{V_3}, \frac{Z_3}{V_3}\right) = \left(\frac{X_1}{V_1}, \frac{Y_1}{V_1}, \frac{Z_1}{V_1}\right) + \left(\frac{X_2}{V_2}, \frac{Y_2}{V_2}, \frac{Z_2}{V_2}\right). \quad (37)$$

In the following, it is shown how the homogenous projective coordinates can be used to remove the need for modular inversion or division from the equations given above for cases (A), (B) and (C). Starting with case (A), substitution for X, Y and Z in terms of the projective coordinates in equations (33), (34) and (35) into the equation given above for $X_3'$, and noting that $c=1+am_z^2+bm_z^3$, yields:

$$\frac{X_3'}{V_3} = \frac{(\lambda_{yv}^2 \lambda_{xv} - 2a\lambda_{zv}\lambda_{xv}^2 Z_1 +}{\lambda_{xzv}} \frac{2a\lambda_{zv}^2\lambda_{xv}X_1 - 3b\lambda_{zv}^2\lambda_{xv}Z_1 + 3b\lambda_{zv}^3 X_1)}{\lambda_{xzv}} - \frac{X_1'}{V_1} - \frac{X_2'}{V_2}, \quad (38)$$

where $$\lambda_{xv}=(X_2 V_1-X_1 V_2) \quad (39)$$

$$\lambda_{yv}=(Y_2 V_1-Y_1 V_2) \quad (40)$$

$$\lambda_{zv}=(Z_2 V_1-Z_1 V_2) \quad (41)$$

$$\lambda_{xzv}=(\lambda_{xv}^3+a\lambda_{xv}\lambda_{zv}^2+b\lambda_{zv}^3). \quad (42)$$

Letting $$V_3=V_1 V_2 \lambda_{xv} \lambda_{xzv} \quad (43)$$

and substituting equation (43) for $V_3$ in equation (38), one obtains $$X_3'=\lambda_{xv} A_{x3}, \quad (44)$$

where $$A_{x3}=\{\lambda_{yv}^2\lambda_{xv}V_2-\lambda_{zv}(2a\lambda_{xv}+3b\lambda_{zv})(\lambda_{xv}Z_1 V_2-\lambda_{zv}X_1 V_2)-\lambda_{xzv}(V_2 X_1+V_1 X_2)\}. \quad (45)$$

Substituting for X and Y in terms of the projective coordinates in equations (33) and (34) into the equation given above for $Y_3'$, and following simplification, gives:

$$\frac{Y_3'}{V_3} = \frac{Y_1}{V_1} + \frac{(Y_2V_1 - Y_1V_2)}{(X_2V_1 - X_1V_2)V_3}\left(X_3' - \frac{X_1V_3}{V_1}\right). \quad (46)$$

Substituting equations (43) and (44) for $V_3$ and $X'_3$ into equation (46) produces $$Y'_3 = V_2\lambda_{xv}\lambda_{xzv}Y_1 + \lambda_{yv}(A_{x3} - V_2\lambda_{xzv}X_1), \quad (47)$$

and substituting X and Z in terms of the projective coordinates in equations (33) and (35) into the equation given above for $Z_3'$, and following simplification, gives:

$$\frac{Z_3'}{V_3} = \frac{Z_1}{V_1} + \frac{(Z_2V_1 - Z_1V_2)}{(X_2V_1 - X_1V_2)V_3}\left(X_3' - \frac{X_1V_3}{V_1}\right). \quad (48)$$

Substituting equations (43) and (44) for $V_3$ and $X'_3$ into equation (48) produces $$Z'_3 = V_2\lambda_{xv}\lambda_{xzv}Z_1 + \lambda_{zv}(A_{x3} - V_2\lambda_{xzv}X_1). \quad (49)$$

The number of field operations needed in equations (44), (47) and (49) are 24 multiplications, three squaring operations, and ten addition operations. When using mixed coordinates, the number of multiplications can be reduced to twenty multiplications.

For case (B), substituting X, Y and Z in terms of the heterogeneous projective coordinate into the equation given above for $Z'_3$, and noting that $X_3=X_1=X_2=X_o$, one obtains $$\frac{Z_3'}{V_3} = \frac{1}{b}\frac{(Y_2V_1 - Y_1V_2)^2}{V_1V_2(Z_2V_1 - Z_1V_2)^2} - \frac{a}{b}\frac{X_1}{V_1} - \frac{Z_1}{V_1} - \frac{Z_2}{V_2}, \quad (50)$$

and letting $$V_3 = V_1^2V_2^2(Z_2V_1 - Z_1V_2)^3, \quad (51)$$

allows for the substitution of equation (51) for $V_3$ into equation (50), yielding:

$$Z_3' = \frac{1}{b}V_1V_2(Z_2V_1 - Z_1V_2)A_{3x}, \quad (52)$$

where $$\frac{Y_3'}{V_3} = \frac{Y_1}{V_1} + \quad (54)$$

$$\frac{(Y_2V_1 - Y_1V_2)}{V_3} \times \left(\frac{Z_3'}{V_1V_2(Z_2V_1 - Z_1V_2)} - \frac{Z_1V_3}{V_1V_2(Z_2V_1 - Z_1V_2)V_1}\right).$$

Substituting Y and Z in terms of the projective coordinates in equations (40) and (41) into the equation for $Y_3'$ produces:

$$A_{3x} = \left\{(Y_2V_1 - Y_1V_2)^2 - (Z_2V_1^2 - Z_1V_2^2)^2\left(\frac{a}{b}X_1V_2 + Z_1V_2 + Z_2V_1\right)\right\}. \quad (53)$$

and substituting equations (51) and (52) for $V_3$ and $Z'_3$ into equation (54) gives $$Y'_3 = V_1V_2^2(Z_2V_1 - Z_1V_2)^3Y_1 + \quad (55)$$
$$(Y_2V_1 - Y_1V_2)\left(\frac{1}{b}A_{3x} - Z_1V_2(Z_2V_1 - Z_1V_2)^2\right).$$

The number of field operations needed in equations (52) and (55) are sixteen multiplication operations, two squaring operations, and seven addition operations.

For case (C.1), substituting X, Y and Z in terms of the projective coordinates in equations (39), (40) and (41) into the equation for $X_3$ produces $$\frac{X_3'}{V_3} = \frac{(3X_o^2 + aZ_o^2)^2}{4V_o^2Y_o^2} - 2\frac{X_o}{V_o}, \quad (56)$$

and letting:

$$V_3 = 8V_o^3Y_o^3 \quad (57)$$

allows for the substitution of equation (57) into equation (56), yielding:

$$X'_3 = 2V_oY_oD_{3x}, \quad (58)$$

where $$D_{3x} = \{(3X_o^2 + aZ_o^2)^2 - 8V_oY_o^2X_o\}. \quad (59)$$

Substituting X, Y and Z in terms of the projective coordinates in equations in equations (39), (40) and (41) into the equation for $Y_3'$, and using the gradient, produces $$\frac{Y_3'}{V_3} = \frac{Y_o}{V_o} + \frac{3X_o^2 + aZ_o^2}{V_3}\left(\frac{2V_oY_oD_{3x}}{2V_oY_o} - \frac{X_oV_3}{2V_oY_oV_o}\right), \quad (60)$$

and substituting equations (57), (58) and (59) for $V_3$, $X'_3$ and $D_3$, gives $$Y'_3 = 8V_o^2Y_o^4 + 3X_o^2 + aZ_o^2((3X_o + aZ_o^2)^2 - 12V_oY_o^2X_o). \quad (61)$$

The number of field operations needed in equations (58) and (61) are six multiplication operations, four squaring operations, and five addition operations.

For case (C.1), substituting X, Y and Z in terms of the projective coordinates in equations (39), (40) and (41) into the equation for $Z_3$ produces $$\frac{Z_3'}{V_3} = \frac{1}{b}\frac{(2aX_oZ_o + 3bZ_o^2)^2}{4Y_o^2V_o^2} - \frac{a}{b}\frac{X_o}{V_o} - 2\frac{Z_o}{V_o} \quad (62)$$

and letting $$V_3 = 8V_o^3Y_o^3 \quad (63)$$

allows for the substitution of equation (63) into equation (62), yielding:

$$Z'_3 = 2V_oY_oD_{3z}, \quad (64)$$

where $$D_{3z} = \left\{\frac{1}{b}(2aX_oZ_o + 3bZ_o^2)^2 - 4\frac{a}{b}V_oY_o^2X_o - 16V_oY_o^2Z_o\right\}, \quad (65)$$

and substituting X, Y and Z in terms of the projective coordinate in equations (39), (40) and (41) into the equation for $Y_3$, and using the gradient, gives:

$$\frac{Y'_3}{V_3} = \frac{Y_0}{V_o} + \frac{2aX_oZ_o + 3bZ_o^2}{2V_oY_0}\left(\frac{Z'_3}{V_3} - \frac{Z_o}{V_o}\right). \quad (66)$$

Substituting equations (63) and (64) for $V_3$ and $Z'_3$ into equation (66) produces $$Y'_3 = 8V_o^2Y_o^3Y_o + (2aX_oZ_o + 3bZ_o^2)(D_{3c} - 4V_oY_o^2Z_o). \quad (67)$$

The number of field operations needed in equations (64) and (67) are ten multiplication operations, three squaring operations, and five addition operations.

Thus, a method of performing symmetric XZ elliptic curve cryptography includes the following steps: (a) a sending correspondent and a receiving correspondent selecting and agreeing upon an elliptic curve set $EC^3$; and (b) the sending correspondent and the receiving correspondent further agreeing upon a random scalar k, wherein the random scalar k is a shared secret key for communication, and agreeing upon a base point $(X_B, Y_B, Z_B) \in EC^3$.

The sending correspondent then performs the following steps: (c) embedding a secret message bit string into an elliptic curve message point $(X_m, Y_m, Z_m)$; (d) computing a scalar multiplication between the base point $(X_B, Y_B, Z_B)$ and the random scalar k as $(X_{Bk}, Y_{Bk}, Z_{Bk}) = k(X_B, Y_B, Z_B)$; (e) computing a cipher point $(X_c, Y_c, Z_c)$ as $(X_c, Y_c, Z_c) = (X_m, Y_m, Z_m) + k(X_B, Y_B, Z_B)$; and (f) sending a set of appropriate bits of $X_c$ and $Z_c$ to the receiving correspondent.

The receiving correspondent then performs the following steps: (g) computing a scalar multiplication between the base point $(X_B, Y_B, Z_B)$ and the random scalar k as $(X_{Bk}, Y_{Bk}, Z_{Bk}) = k(X_B, Y_B, Z_B)$; (h) computing the elliptic curve message point $(X_m, Y_m, Z_m)$ as $(X_m, Y_m, Z_m) = (X_c, Y_c, Z_c) - k(X_B, Y_B, Z_B)$; and (i) retrieving the secret message bit string from $X_m$ and $Z_m$.

In an alternative embodiment for performing public key cryptography, the sending and the receiving entities use two keys; i.e., a private key and a public key. The alternative method of performing symmetric XZ elliptic curve cryptography with a public key includes the following steps: (a) a sending correspondent and a receiving correspondent selecting and agreeing upon an elliptic curve set $EC^3$, the sending correspondent establishing a sending private key $k_{SPr}$ and the receiving correspondent establishing a receiving private key $k_{RPr}$; and (b) the sending correspondent and the receiving correspondent further agreeing upon a base point $(X_B, Y_B, Z_B) \in EC^3$, the receiving correspondent establishing a receiving public key $k_{RPr}(X_B, Y_B, Z_B)$ and the sending correspondent establishing a sending public key $k_{SPr}(X_B, Y_B, Z_B)$.

The sending correspondent then performs the following steps: (c) calculating a shared key as $k_{SPr}(k_{RPr}(X_B, Y_B, Z_B))$; (d) embedding a secret message bit string into an elliptic curve message point $(X_m, Y_m, Z_m)$; (e) computing a cipher point $(X_c, Y_c, Z_c)$ as $(X_c, Y_c, Z_c) = (X_m, Y_m, Z_m) + k_{SPr}(k_{RPr}(X_B, Y_B, Z_B))$; and (f) sending a set of appropriate bits of $X_m$ and $Z_m$ to the receiving correspondent.

The receiving correspondent then performs the following steps: (g) calculating the shared key as $k_{RPr}(k_{SPr}(X_B, Y_B, Z_B))$; (h) computing the elliptic curve message point $(X_m, Y_m, Z_m)$ as $(X_m, Y_m, Z_m) = (X_c, Y_c, Z_c) - k_{RPr}(k_{SPr}(X_B, Y_B, Z_B))$; and (i) retrieving the first secret message bit string from $X_m$ and $Z_m$.

The various known schemes used for digital signatures that are based on the representation of the elliptic curve points in affine coordinates can be adopted for $EC^3$ digital signatures as well. This can be achieved either directly, or with some modifications that exploit the X-coordinate and the Z-coordinate of an elliptic curve point when represented in projective coordinates in generating a digital signature.

A conventional elliptic curve digital signature can be basically summarized as follows: (a) the entity that generates a signature has a private key $k_{Pr}$ and a public key $(x_{Pu}, y_{Pu}) = k_{Pr}(x_B, y_B)$. Given a message M, the entity generating the signature performs the following steps: (b) selecting a random integer k, mod p; (c) computing $(x_1, y_1) = k(x_1, y_1)$ and converting $x_1$ to an integer r mod p; (d) computing a message digest digest(M), which is a bit string that is dependent upon the message, and converting the bit string into an integer e; (e) computing $s = k^{-1}(e + k_{Pr}r) \bmod p$; and (f) generating the signature of the message M as (r,s). The signature is then verified at the receiving entity using the following steps: (g) computing a message digest digest(M) and converting the bit string into an integer e; (h) computing $u_1 = es^{-1} \bmod p$ and $u_2 = rs^{-1} \bmod p$; (i) computing $(x_2, y_2) = u_1(x_B, y_B) + u_2(x_{Pu}, y_{Pu})$ and converting $x_2$ into an integer v mod p; and (j) accepting the signature if v = r.

Using X- and Z-coordinates for generating a digital signature, the above elliptic curve digital signature can be modified as follows: (a) the entity that generates a signature has a private key $k_{Pr}$ and a public key $(X_{Pu}, Y_{Pu}, Z_{Pu}) = k_{Pr}(X_B, Y_B, Z_B)$. Given a message M, the entity generating the signature performs the following steps: (b) selecting a random integer k, wherein the random integer k is modulo p, wherein p is a selected integer; (c) computing $(X_1, Y_1, Z_1) = k(X_B, Y_B, Z_B)$; (d) concatenating bit strings of $X_1$ and $Z_1$ together to form a single string $[X_1:Z_1]$; (e) converting the single string $[X_1:Z_1]$ into an integer r mod p; (f) computing a message digest digest(M), which is a bit string that is dependent upon the message, and converting the bit string into an integer e; (g) computing $s = k^{-1}(e + k_{Pr}r) \bmod p$; and (h) generating the signature of the message M as (r,s). The signature is then verified at the receiving entity using the following steps: (i) computing a message digest digest(M) and converting the bit string into an integer e; (j) computing $u_1 = es^{-} \bmod p$ and $u_2 = rs^{-1} \bmod p$; (k) computing $(X_2, Y_2, Z_2) = u_1(X_B, Y_B, Z_B) + u_2(X_{Pu}, Y_{Pu}, Z_{Pu})$; (l) concatenating bit strings of $X_2$ and $Z_2$ together to form a single string $[X_2:Z_2]$; (m) converting the single string $[X_2:Z_2]$ into an integer v mod p; and (n) accepting the signature if v = r.

$EC^3$ elliptic curve cryptography provides a complete basis for implementing the SSL protocol. In particular, it offers a public key system resembling Deffi-Hellman's system. Further, it offers a digital signature protocol that resembles ECDSA. Other required primitives, such as the hashing function and the stream cipher, can be adopted as in the original implementation. In other words, the use of $EC^3$ affects only the handshake component of the protocol.

In the preferred embodiment, the session begins with the client and the server exchanging random nonces, which are used to prevent replay attacks. Then, a cipher-suit is negotiated with the "ClientHello" and the "ServerHello" messages. The server then sends the "ServerCertificate" message which contains its $EC^3$ public key signed by a certification authority using $EC^3$ DSA. After validating the $EC^3$ DSA signature, the client sends its $EC^3$ public key to the server through a "ClientKeyExchange" message. Each entity then uses its private key along with the other entity's public key to arrive at a premaster secret. As in the SSL standard, the premaster secret can then be used, along with the random nonces exchanged earlier, to create a shared key that is used for data transfer.

As noted above, IPsec is a modular standard that provides for privacy and authentication. $EC^3$ ECC may be used in IPsec, as it offers all the needed primitives. Further, it has efficiency and security advantages when compared to $EC^2$ and other public key systems. In particular, $EC^3$ ECC has the ability to achieve higher levels of security using smaller fields/keys.

As $EC^3$ is a strong candidate for use in implementing SSL and IPsec, it is also a good choice for a uniform implementation of VPN over public, insecure networks. The efficiency and security advantages when compared to $EC^2$ and other public key systems strongly suggests the use of $EC^3$ in implementing industry-strength VPNs. In particular, the ability to achieve higher levels of security using smaller fields/keys is a good reason for adopting $EC^3$ ECC network security protocols, including VPNs.

The Legendre Symbol is used to test whether an element of F(p) has a square root or not; i.e., whether an element is quadratic residue or not. The Legendre Symbol and test are as follows. Given an element of a finite field F(p), such as d, the Legendre symbol is defined as $$\left(\frac{d}{p}\right).$$

In order to test whether d is quadratic residue or not, the Legendre symbol, $$\left(\frac{d}{p}\right),$$

is computed such that:

$$\left(\frac{d}{p}\right) = \begin{cases} +1 & \text{if } x \text{ is quadratic residue} \\ 0 & \text{if } x \equiv 0 \bmod F(p) \\ -1 & \text{otherwise.} \end{cases}$$

The security of the password protocols depends on the security of the underlying elliptic polynomial cryptography. The security of elliptic polynomial cryptosystems is assessed by both the effect on the solution of the elliptic curve discrete logarithmic problem (ECDLP) and power analysis attacks.

It is well known that the elliptic curve discrete logarithm problem (ECDLP) is apparently intractable for non-singular elliptic curves. The ECDLP problem can be stated as follows: given an elliptic curve defined over F that needs N-bits for the representation of its elements, an elliptic curve point $(x_P, y_P)$ $\in$ EC, defined in affine coordinates, and a point $(x_Q, y_Q) \in$ EC, defined in affine coordinates, determine the integer k, $0 \le k \le n-1$, such that $(x_Q, y_Q) = k(x_P, y_P)$, provided that such an integer exists. In the below, it is assumed that such an integer exists.

The most well known attack used against the ECDLP is the Pollard p-method, which has a complexity of $O(\sqrt{\pi K}/2)$, where K is the order of the underlying group, and the complexity is measured in terms of an elliptic curve point addition.

Since the underlying cryptographic problems used in the above block cipher chaining methods is the discrete logarithm problem, which is a known difficult mathematical problem, it is expected that the security of the above methods are more secure than prior art ciphers which are not based on such a mathematically difficult problem.

Projective coordinate can also be used by the sending correspondent and the receiving correspondent to embed extra message data bits in the projective coordinate wherein the addition of the corresponding elliptic points is defined in (nx+ny+3) dimensional space where there are (nx+1) x-coordinates, (ny+1) y-coordinates and one projective coordinate.

The equations for the addition rule can be obtained by using the elliptic polynomial equation with (nx+1) x-coordinates and (n+1) y-coordinates in projective coordinates and substituting a straight line equation to obtain a cubic equation in terms of one of the x-coordinates. This cubic equation can be used to identify the third point of intersection between a straight line and the elliptic polynomial in (nx+ny+3) dimensions given two other intersection points. This third point of intersection is used to identify the sum of the given two points.

For the present method, the ECDLP in EC can be stated as follows: given a point $(X_P, Y_P, Z_P) \in EC^3$ and a point $(X_Q, Y_Q, Z_Q) \in EC^3$ defined in projective coordinates, find k such that $(X_Q, Y_Q, Z_Q) = k(X_P, Y_P, Z_P)$. In $EC^3$, the modified Pollard p-method can be formulated as follows: find two points:

$(X_i, Y_i, Z_i) = A_i(X_Q, Y_Q, Z_Q) + B_i k(X_P, Y_P, Z_P)$ and $(X_j, Y_j, Z_j) = A_j(X_Q, Y_Q, Z_Q) + B_j k(X_P, Y_P, Z_P)$ such that $(X_i, Y_i, Z_i) = (X_j, Y_j, Z_j)$, and hence $$k = \frac{A_i + A_j}{B_i + B_j},$$

and given that all the points are members of $EC^3$.

It is clear that the complexity of the Pollard p-method in $EC^3$ is not less than the complexity of the Pollard p-method in $EC^2$ for the same group order. It should also be noted that since EC encryption and $EC^2$ encryption are generated by the same elliptic curve, all the analysis of the security of EC cryptography will be applicable to the analysis of the security of $EC^3$ cryptography. Moreover, the introduction of the isomorphic transformation indexed by the three transformation indices has an effect of hiding the original curve on which data has been originally ciphered, which makes cryptanalysis even harder.

A third projection can be used to enhance the more general elliptic polynomial cryptography, provided that the first projection has been applied to the polynomial. An alternative form of the elliptic polynomial equation with more than one x-coordinate and one or more y-coordinates is used, with the equation following the conditions: some of the variables (i.e., the y-coordinates) have a maximum degree of two; other variables (i.e., the x-coordinates) have a maximum degree of three; a monomial cannot contain an x-coordinate variable and a y-coordinate variable; all monomials that contain x-coordinates must have a degree of three or less; and all monomials that contain y-coordinates must have a degree of two.

Letting $S_{nx}$ represents the set of numbers between 0 and n in x (i.e., $S_{nx} = \{0, \ldots, nx\}$) and letting $S_{ny}$ represents the set of numbers between 0 and n in y (i.e., $S_{ny} = \{0, \ldots, ny\}$), and letting (nx+ny) be greater than or equal to one, then, given a finite field F, the following equation defined over F is one example of the polynomial equation described above:

$$\sum_{k \in S_{ny}} a_{1k} y_k^2 + \sum_{k,l \in S_{ny}, l \ne k} a_{2kl} y_k y_l + \sum_{k \in S_{ny}} a_{3k} y_k + \sum_{k,l \in S_{ny}, i \in S_{nx}} c_{1kli} y_k y_l x_i + \quad (68)$$

-continued $$\sum_{k \in S_{ny}, l \in S_{nx}} c_{2kl} y_k x_l + \sum_{k \in S_{ny}, l, i \in S_{nx}} c_{3kli} y_k x_l x_i =$$

$$\sum_{l \in S_{nx}} b_{1l} x_l^3 + \sum_{l, k \in S_{nx}, l \neq k} b_{2lk} x_l^2 x_k + \sum_{l, k \in S_{nx}} b_{3lk} x_l x_k + \sum_{k \in S_{nx}} b_{4k} x_k + b_c$$

where $a_{1l}, a_{2kl}, a_{3k}, c_{1lki}, c_{2kl}, c_{3kli}, b_{1l}, b_{2lk}, b_{3lk}, b_{4k}, b_c \in F$.

A method of performing symmetric XZ elliptic curve cryptography with multiple x-coordinates includes the following steps: (a) a sending correspondent and a receiving correspondent selecting and agreeing upon an elliptic curve set $EC^3$; and (b) the sending correspondent and the receiving correspondent further agreeing upon values of nx and ny and a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, and further agreeing upon a random number k and a base point:

$$(x_{0,B}, x_{1,B}, \ldots, x_{nx,B}, y_{1,B}, y_{1,B}, \ldots, y_{ny,B}) \in EC^{nx+ny+2}.$$

The sending correspondent then performs the following steps: (c) embedding a secret message bit string into the (nx+1) x-coordinates $x_0, x_1, \ldots, x_{nx}$, and the ny y-coordinates $y_1, \ldots, y_{ny}$ of the elliptic message point:

$$(x_{0,M}, x_{1,m}, \ldots, x_{nx,m}, y_{0,m}, y_{1,m}, \ldots, y_{ny,m}) \in EC^{xn+ny+2};$$

(d) computing a scalar multiplication between the base point $(x_{0,B}, x_{1,B}, \ldots, x_{nx,B}, y_{0,B}, y_{1,B}, \ldots, y_{ny,B})$ and the random scalar k as $k(x_{0,B}, x_{1,B}, \ldots, x_{nx,B}, y_{0,B}, y_{1,B}, \ldots, y_{ny,B})$; (e) computing a cipher point $$(x_{0,c}, x_{1,c}, \ldots, x_{nx,c}, y_{0,c}, y_{1,c}, \ldots, y_{ny,c}) \text{ as:}$$

$$(x_{0,c}, x_{1,c}, \ldots, x_{nx,c}, y_{0,c}, y_{1,c}, \ldots, y_{ny,c}) =$$
$$(x_{0,m}, x_{1,m}, \ldots, x_{nx,m}, y_{0,m}, y_{1,m}, \ldots, y_{ny,m}) +$$
$$(x_{0,B}, x_{1,B}, \ldots, x_{nx,B}, y_{0,B}, y_{1,B}, \ldots, y_{ny,B});$$

(f) sending the appropriate bits of the x-coordinates $x_{0,c}, x_{1,c}, \ldots, x_{nx,c}$ and the y-coordinates $Y_{1,c}, \ldots, y_{ny,c}$ of the cipher point, and any additional information needed to help recover the message bit string without compromising security, to the receiving correspondent.

The receiving correspondent then performs the following steps: (g) computing a scalar multiplication between the base point $(x_{0,B}, x_{1,B}, \ldots, x_{nx,B}, y_{0,B}, y_{1,B}, \ldots, y_{ny,B})$ and the random scalar k as $k(x_{0,B}, x_{1,B}, \ldots, x_{nx,B}, y_{0,B}, y_{1,B}, \ldots, y_{ny,B})$; (h) computing the elliptic curve message point:

$$(x_{0,m}, x_{1,m}, \ldots, x_{nx,m}, y_{0,m}, y_{1,m}, \ldots, y_{ny,m}) \text{ as:}$$

$$(x_{0,m}, x_{1,m}, \ldots, x_{nx,m}, y_{0,m}, y_{1,m}, \ldots, y_{ny,m}) =$$
$$(x_{0,c}, x_{1,c}, \ldots, x_{nx,c}, y_{0,c}, y_{1,c}, \ldots, y_{ny,c}) -$$
$$(x_{0,B}, x_{1,B}, \ldots, x_{nx,B}, y_{0,B}, y_{1,B}, \ldots, y_{ny,B});$$

and (i) retrieving the secret message bit string from the (nx+1) x-coordinates $x_{0,m}, x_{1,m}, \ldots, x_{nx,m}$ and the ny y-coordinates $y_{1,m}, \ldots, y_{ny,m}$ and using any additional information received from the sending entity.

The method for performing public key cryptography given above may similarly be performed for multiple x-coordinates. In the above, the step of embedding include the following steps: (a) defining the respective message bit string as an M-bit string, where M is an integer such that (3N−L)>M>(2N−L), L is an integer, N represents a number of bits used to represent F(p) elements, and F(p) represents a finite field containing the elliptic curve set $EC^3$, where p represents a set of points on $EC^3$; (b) dividing the respective message bit string into three strings $m_1$, $m_2$ and $m_3$, where the length of string $m_1$ is less than or equal to (N−L) bits, the length of string $m_2$ is less than or equal to (N−1) bits, and the length of string $m_3$ is less than or equal to N bits; (c) assigning the value of the bit string $m_3$ to $E_m$; (d) assigning the value of the bit string $m_2$ to $Z_m$ by first assigning the value of the bit string $m_2$ to $R_m$, then using a Legendre test to determine if $R_m$ has a square root, and then, if $R_m$ has a square root, setting $Z_m = R_m$ and if $R_m$ does not have a square root, then setting $Z_m = gR_m$, where g is non-quadratic residue in F(p); (e) computing $aZ_m^2$ and $bZ_m^3$, where a and b are selected scalars; (f) assigning the value of the bit string $m_1$ to $X_m$; (g) computing a value T as $T = X_m^3 + (aZ_m^2)X_m + (bZ_m^3)$ and using a Legendre test to determine if T has a square root; and (h) assigning the square root of T to $Y_m$ if T has a square root, and incrementally increasing $X_m$ and returning to step (g) if T does not have a square root.

Figure 1:
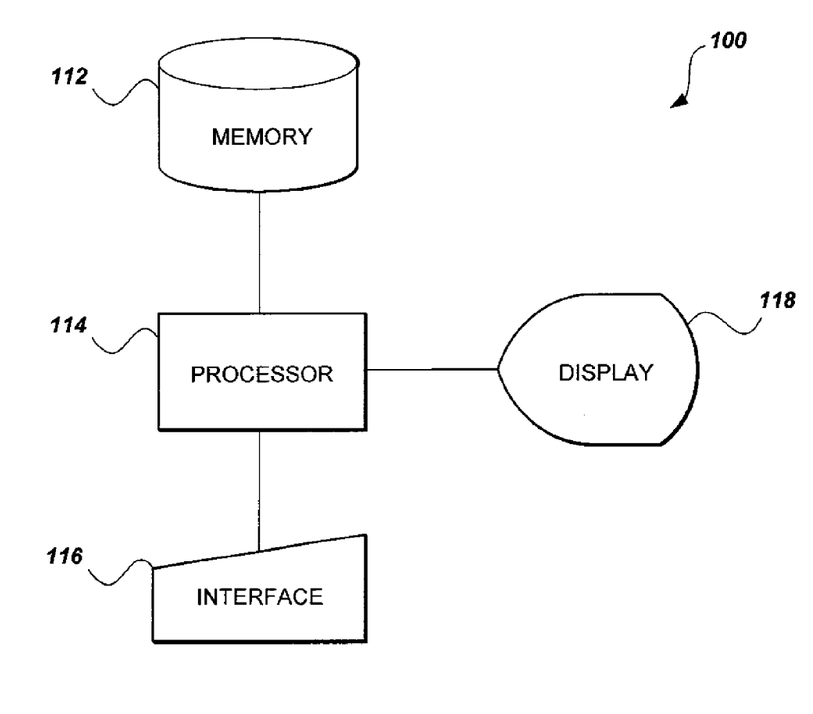

It should be understood that the calculations may be performed by any suitable computer system, such as that diagrammatically shown in the sole drawing Figure. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computer software product that includes a non-transitory storage medium readable by a processor, the non-transitory storage medium having stored thereon a set of instructions for performing public key XZ-elliptic curve cryptography for use with network security protocols, the instructions comprising:

(a) a first set of instructions which, when loaded into main memory and executed by the processor, causes the processor to calculate a shared key as a scalar multiplication between a sending private key $k_{SPr}$, a receiving private key $k_{RPr}$ and a base point $(X_B, Y_B, Z_B)$ as $k_{SPr}(k_{RPr}(X_B, Y_B, Z_B))$, wherein a sending correspondent and a receiving correspondent select and agree upon an elliptic curve set $EC^3$, and the sending correspondent establishes the sending private key $k_{SPr}$ and the receiving correspondent establishes the receiving private key $k_{RPr}$, the sending correspondent and the receiving correspondent further agreeing upon the base point $(X_B, Y_B, Z_B) \in EC^3$, and the receiving correspondent establishing a receiving public key $k_{RPr}(X_B, Y_B, Z_B)$ and the sending correspondent establishing a sending public key $k_{SPr}(X_B, Y_B, Z_B)$;

(b) a second set of instructions which, when loaded into main memory and executed by the processor, causes the processor to embed a secret message bit string into an elliptic curve message point $(X_m, Y_m, Z_m)$, wherein the embedding is performed as:
- (i) defining the respective message bit string as an M-bit string, wherein M is an integer such that $(3N-L) > M > (2N-L)$, where L is an integer, N represents a number of bits used to represent F(p) elements, F(p) representing a finite field containing the elliptic curve set $EC^3$, wherein D represents a set of points on $EC^3$,
- (ii) dividing the respective message bit string into three strings $m_1$, $m_2$ and $m_3$, wherein the length of string $m_1$ is less than or equal to $(N-L)$ bits, the length of string $m_2$ is less than or equal to $(N-1)$ bits, and the length of string $m_3$ is less than or equal to N bits;
- (iii) assigning the value of the bit string $m_3$ to $E_m$;
- (iv) assigning the value of the bit string $m_2$ to $Z_m$ by first assigning the value of the bit string $m_2$ to $R_m$, then using a Legendre test to determine if $R_m$ has a square root, and then, if $R_m$ has a square root, setting $Z_m = R_m$ and if $R_m$ does not have a square root, then setting $Z_m = gR_m$, wherein g is non-quadratic residue in F(p);
- (v) computing $aZ_m^2$ and $bZ_m^2$, wherein a and b are selected scalars;
- (vi) assigning the value of the bit string $m_1$ to $X_m$;
- (vii) computing a value T as $T = X_m^3 + (aZ_m^2)X_m + (bZ_m^3)$ and using a Legendre test to determine if T has a square root; and
- (viii) assigning the square root of T to $Y_m$ if T has a square root, and incrementally increasing $X_m$ and returning to step (vii) if T does not have a square root;

(c) a third set of instructions which, when loaded into main memory and executed by the processor, causes the processor to compute a cipher point $(X_c, Y_c, Z_c)$ as $(X_c, Y_c, Z_c) = (X_m, Y_m, Z_m) + k_{SPr}(k_{RPr}(X_B, Y_B, Z_B))$;

(d) a fourth set of instructions which, when loaded into main memory and executed by the processor, causes the processor to record a set of appropriate bits of $X_c$ and $Z_c$ as an encoded bit string and sending the set of appropriate bits of $X_c$ and $Z_c$ forming the encoded bit string to the receiving correspondent;

(e) a fifth set of instructions which, when loaded into main memory and executed by the processor, causes the processor to calculate the shared key as $k_{RPr}(k_{SPr}(X_B, Y_B, Z_B))$;

(f) a sixth set of instructions which, when loaded into main memory and executed by the processor, causes the Processor to compute the elliptic curve message point $(X_m, Y_m, Z_m)$ as $(X_m, Y_m, Z_m) = (X_c, Y_c, Z_c) - k_{RPr}(k_{SPr}(X_B, Y_B, Z_B))$;

(g) a seventh set of instructions which, when loaded into main memory and executed by the processor, causes the processor to retrieve the first secret message bit string from $X_m$ and $Z_m$;

(h) an eighth set of instructions which, when loaded into main memory and executed by the processor, causes the processor to select a random integer k, wherein the random integer k is modulo p, wherein p is a selected integer at the sending correspondent;

(i) a ninth set of instructions which, when loaded into main memory and executed by the processor, causes the processor to compute a scalar multiplication for a first signature point $(X_1, Y_1, Z_1)$ as $(X_1, Y_1, Z_1) = k(X_B, Y_B, Z_B)$ at the sending correspondent;

(j) a tenth set of instructions which, when loaded into main memory and executed by the processor, causes the processor to concatenate bit strings of $X_1$ and $Z_1$ together to form a single bit string $[X_1:Z_1]$ at the sending correspondent;

(k) an eleventh set of instructions which, when loaded into main memory and executed by the processor, causes the processor to convert the single bit string $[X_1:Z_1]$ into an integer r mod p at the sending correspondent;

(l) a twelfth set of instructions which, when loaded into main memory and executed by the processor, causes the processor to compute a message digest digest(M), wherein digest(M) is a bit string dependent upon secret message M, and converting the bit string into an integer e at the sending correspondent;

(m) a thirteenth set of instructions which, when loaded into main memory and executed by the processor, causes the processor to compute a signature value s as $s = k^{-1}(e + k_{Pr}r) \bmod p$ at the sending correspondent:

(n) a fourteenth set of instructions which, when loaded into main memory and executed by the processor, causes the processor to generate a digital signature of the message M as (r,s) at the sending correspondent;

(o) a fifteenth set of instructions which, when loaded into main memory and executed by the processor, causes the processor to compute the message digest digest(M) and converting the bit string into an integer e at the receiving correspondent;

(p) a sixteenth set of instructions which, when loaded into main memory and executed by the processor, causes the processor to compute a pair of intermediate values $u_1$ and $u_2$ as $u_1 = es^{-1} \bmod p$ and $u_2 = rs^{-1} \bmod p$, respectively, at the receiving correspondent;

(q) a seventeenth set of instructions which, when loaded into main memory and executed by the processor, causes the processor to compute a scalar multiplication for a second signature point $(X_2, Y_2, Z_2)$ as $(X_2, Y_2, Z_2) = u_1(X_B, Y_B, Z_B) + u_2(X_{Pu}, Y_{Pu}, Z_{Pu})$ at the receiving correspondent;

(r) an eighteenth set of instructions which, when loaded into main memory and executed by the processor, causes the processor to concatenate bit strings of $X_2$ a $Z_2$ together to form a single bit string $[X_2:Z_2]$ at th receiving correspondent;

(s) a nineteenth set of instructions which, when loaded into main memory and executed by the processor, causes the processor to convert the single bit string $[X_2:Z_2]$ into an integer v mod p at the receiving correspondent; and (t) a twentieth set of instructions which, when loaded into main memory and executed by the processor, causes the processor to accept the digital signature if v=r at the receiving correspondent.

2. A system for performing public key XZ-elliptic curve cryptography for use with network security protocols, wherein a sending correspondent and a receiving correspondent select and agree upon an elliptic curve set $EC^3$, wherein the sending correspondent further establishes a sending private key $k_{SPr}$ and the receiving correspondent establishes a receiving private key $k_{RPr}$, the sending correspondent and the receiving correspondent further agreeing upon a base point $(X_B, Y_B, Z_B) \in EC^3$, the receiving correspondent establishing a receiving public key $k_{RPr}(X_B, Y_B, Z_B)$ and the sending correspondent establishing a sending public key $k_{SPr}(X_B, Y_B, Z_B)$, the system comprising:
a processor,
computer readable memory coupled to the processor;
a user interface coupled to the processor;
a display coupled to the processor, software stored in the memory and executable by the processor, the software having:

means for calculating a shared key as a scalar multiplication between a sending private key $k_{SPr}$, a receiving private key $k_{RPr}$ and a base point $(X_B, Y_B, Z_B)$ as $k_{SPr}(k_{RPr}(X_B, Y_B, Z_B))$;

means for embedding a secret message bit string into an elliptic curve message point $(X_m, Y_m, Z_m)$, wherein said means for embedding comprise:

means for defining the respective message bit string as an M-bit string, wherein M is an integer such that $(3N-L) > M > (2N-L)$, where L is an integer, N represents a number of bits used to represent $F(p)$ elements, $F(p)$ representing a finite field containing the elliptic curve set $EC^3$, wherein p represents a set of points on $EC^3$;

means for dividing the respective message bit string into three strings $m_1$, $m_2$ and $m_3$, wherein the length of string $m_1$ is less than or equal to $(N-L)$ bits, the length of string $m_2$ is less than or equal to $(N-1)$ bits, and the length of string $m_3$ is less than or equal to N bits;

means for assigning the value of the bit string $m_3$ to $E_m$;

means for assigning the value of the bit string $m_2$ to $Z_m$ by first assigning the value of the bit string $m_2$ to $R_m$, then using a Legendre test to determine if $R_m$ has a square root, and then, if $R_m$ has a square root, setting $Z_m = R_m$ and if $R_m$ does not have a square root, then setting $Z_m = gR_m$, wherein 2 is non-quadratic residue in $F(p)$;

means for computing $aZ_m^2$ and $bZ_m^3$, wherein a and b are selected scalars;

means for assigning the value of the bit string $m_1$ to $X_m$;

means for computing a value T as $T = X_m^3 + (aZ_m^2)X_m + (bZ_m^3)$ and using a Legendre test to determine if T has a square root; and means for assigning the square root of T to $Y_m$ if T has a square root, and incrementally increasing $X_m$ and returning to step (vii) if T does not have a square root;

means for computing a cipher point $(X_c, Y_c, Z_c)$ as $(X_c, Y_c, Z_c) = (X_m, Y_m, Z_m) + k_{SPr}(k_{RPr}(X_B, Y_B, Z_B))$;

means for recording a set of appropriate bits of $X_c$ and $Z_c$ as an encoded bit string;

means for sending the set of appropriate bits of $X_c$ and $Z_c$ forming the encoded bit string to the receiving correspondent;

means for calculating the shared key as $k_{RPr}(k_{SPr}(X_B, Y_B, Z_B))$;

means for computing the elliptic curve message point $(X_m, Y_m, Z_m)$ as $(X_m, Y_m, Z_m) = (X_c, Y_c, Z_c) - k_{RPr}(k_{SPr}(X_B, Y_B, Z_B))$;

means for retrieving the first secret message bit string from $X_m$ and $Z_m$;

means for selecting a random integer k, wherein the random integer k is modulo p, wherein p is a selected integer at the sending correspondent;

means for computing a scalar multiplication for a first signature point $(X_1, Y_1, Z_1)$ as $(X_1, Y_1, Z_1) = k(X_B, Y_B, Z_B)$ at the sending correspondent;

means for concatenating bit strings of $X_1$ and $Z_1$ together to form a single bit string $[X_1:Z_1]$ at the sending correspondent;

means for converting the single bit string $[X_1:Z_1]$ into an integer r mod p at the sending correspondent;

means for computing a message digest digest(M), wherein digest(M) is a bit string dependent upon secret message M, and converting the bit string into an integer e at the sending correspondent;

means for computing a signature value s as $s = k^{-1}(e + k_{Pr}r)$ mod p at the sending correspondent;

means for generating a digital signature of the message M as (r,s) at the sending correspondent;

means for computing the message digest digest(M) and converting the bit string into an integer e at the receiving correspondent;

means for computing a pair of intermediate values $u_1$ and $u_2$ as $u_1 = es^{-1}$ mod p and $u_2 = rs^{-1}$ mod p, respectively, at the receiving correspondent;

means for computing a scalar multiplication for a second signature point $(X_2, Y_2, Z_2)$ as $(X_2, Y_2, Z_2) = u_1(X_B, Y_B, Z_B) + u_2(X_{Pu}, Y_{Pu}, Z_{Pu})$ at the receiving correspondent;

means for concatenating bit strings of $X_2$ ad $Z_2$ together to form a single bit string $[X_2:Z_2]$ at the receiving correspondent;

means for converting the single bit string $[X_2:Z_2]$ into an integer v mod p at the receiving correspondent; and means for accepting the digital signature if v=r at the receiving correspondent.

* * * * *